Oct. 1, 1968  V. B. SAUER  3,403,445
POLAR COORDINATE CHART READER
Filed Sept. 28, 1966  2 Sheets-Sheet 1

INVENTOR
VERNON B. SAUER
BY
ATTORNEYS

Oct. 1, 1968  V. B. SAUER  3,403,445
POLAR COORDINATE CHART READER
Filed Sept. 28, 1966  2 Sheets-Sheet 2

3,403,445
POLAR COORDINATE CHART READER
Vernon B. Sauer, Baton Rouge, La., assignor to the United States of America as represented by the Secretary of the Interior
Filed Sept. 28, 1966, Ser. No. 583,124
6 Claims. (Cl. 33—1)

ABSTRACT OF THE DISCLOSURE

A wheel on the device is parallel to and polarly coaxially aligned with a polar coordinate graph-containing chart held by the device. The wheel has a larger diameter than the paper chart and is calibrated to read in the chart's $\theta$ coordinate. A pointer on the device can be directed toward individual points along a radial path on the chart. Magnitude of pointer movement is translated to a measuring device calibrated to read in the chart's $\rho$ coordinate.

---

Figure 1:
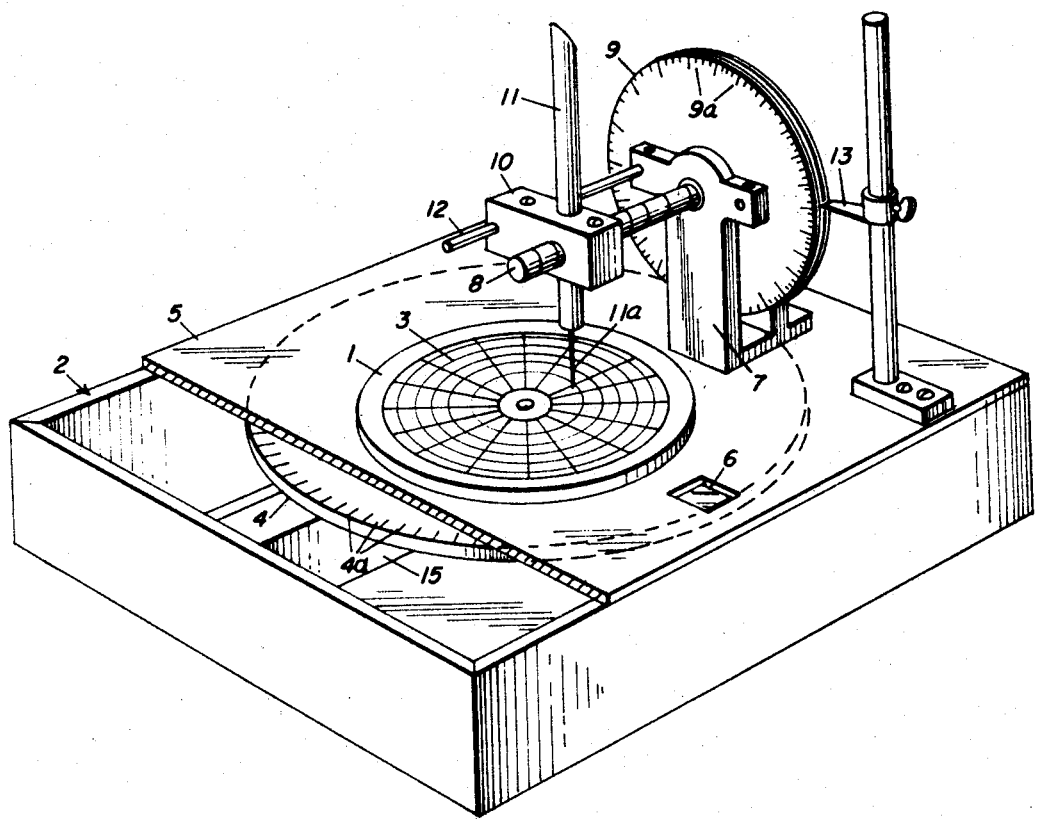

This invention relates to a device for reading the coordinates of a polar coordinate graph.

Polar coordinate graph paper is used frequently on recording instruments where the paper revolves on the instrument usually in accordance with time (as demarcated by the radial lines on the paper), while one or more marking devices make graph recordings on the paper in accordance with another variable (as demarcated by the concentric circles on the graph paper). The angular movement is commonly denoted as $\theta$ and the movement along the radius is $\rho$. An example of a commercially available recorder that employs polar coordinate paper is the stage-rainfall recorder used to determine rainfall and the relative level of bodies of water such as small watersheds.

Due to the comparatively small size of the graph paper conventionally employed in many instances, it is difficult to accurately and rapidly read the coordinates of any point on the resultant graph. Presently employed reading methods involve visual inspection with the aid of scales and templates. An example of a difficult-to-read chart is the graph produced by conventional stage-rainfall recorders wherein hourly radial line divisions on the graph paper usually vary in width from 0.12 inch to 0.65 inch. Relative water level concentric circle divisions are usually 0.10 inch apart and represent 0.25 ft., 0.50 ft., or 1.00 ft., depending on the scale of the recorder. Rainfall is also graphically shown wherein the concentric circles division usually represents 0.25 inch. Obviously, a visual reading of these graphs at small time intervals, e.g., 10 minutes, is quite difficult and time consuming because of the variable time scale division and the small, and sometimes unusual water depth scale.

I have now devised an apparatus for rapidly and easily reading the coordinates at any point on a polar coordinate graph. Generally, the device involves a wheel having a larger radius than the polar coordinate graph paper, over which the paper is coaxially placed. The wheel is calibrated at its peripheral area to read in a much smaller incremental value than the incremental value represented by the distance between adjacent radial lines printed on the graph paper. In addition, there is a pointer on the device which is poised above the graph paper and adapted to be moved to designate individual points along a radial locus of points on the paper when the paper is held fixed, the degree of pointer movement being translated to a measuring device such as a disc which is calibrated to read in a much smaller incremental value than the incremental value represented by the distance between adjacent concentric circles printed on the graph paper.

It is therefore an object of this invention to provide a device for rapidly making $\theta$ coordinate readings on a polar coordinate graph at much smaller increments than can be obtained visually.

A further object is to provide a device for rapidly making $\rho$ coordinate readings on the graph at much smaller increments than can be obtained visually.

Figure 2:
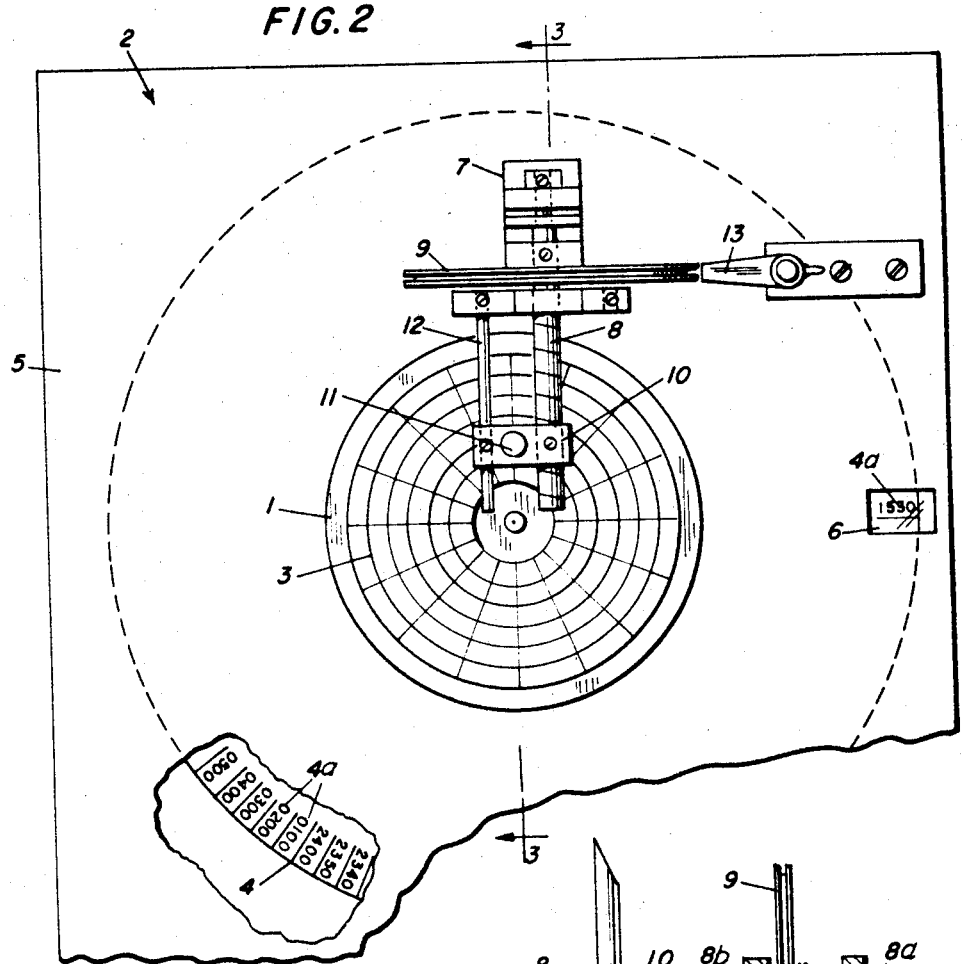
Figure 3:
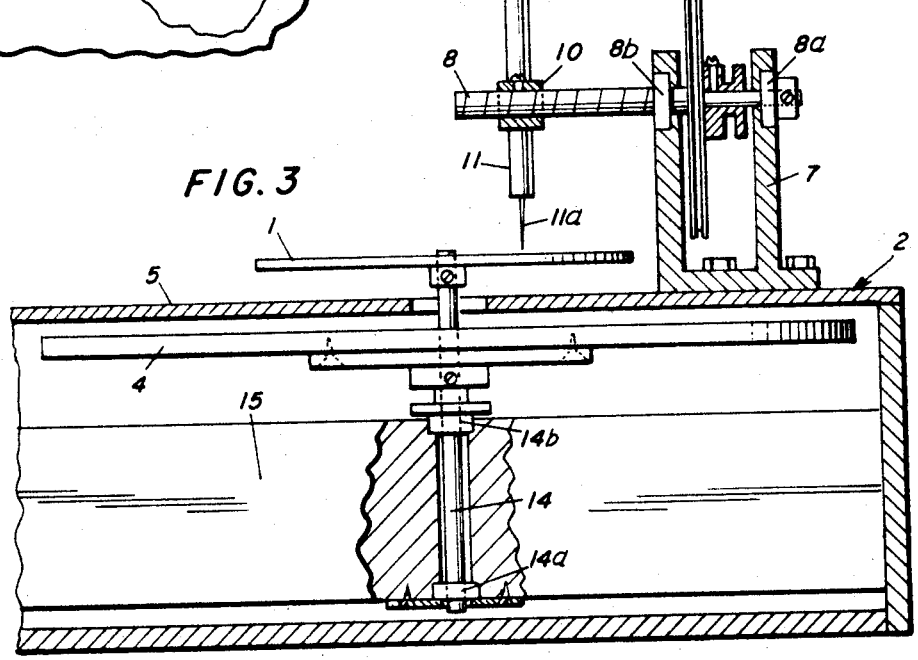

Other objects and advantages of the present invention will be obvious from the detailed description of the invention appearing in the following specification taken with the accompanying drawings in which FIG. 1 is a fragmentary perspective view of the device;
FIG. 2 is a fragmentary top view of the device; and
FIG. 3 is a side view taken partially in section along line 3—3 in FIG. 2.

Referring to FIGURES 1 and 2, reference numeral 1 designates a disc-shaped member or table, rotatably secured to a box-shaped base member 2, on which the graph-containing polar coordinate paper 3 is placed. Rotatably secured within box 3, polarly coaxially with, parallel to, and immediately below table 1, is a disc-shaped member or wheel 4 having a larger radius than the table and graph paper. A box cover plate 5 disposed between the wheel and table covers most of the wheel. Printed or otherwise attached to the peripheral area of the upper surface of the wheel are markings 4a such as numerals or other symbols representing the variable shown by the radial lines printed on the polar coordinate paper; the distance between adjacent markings on the wheel representing a much smaller incremental value than that represented by the distance between adjacent radial lines printed on the graph paper. For example, if the variable is time and the distance between adjacent radial lines on the paper is representative of one hour, the distance between adjacent markings on the wheel can represent only five or ten minutes. A window 6 is cut through plate 5 so that one wheel marking at a time can be observed.

Still referring to FIGS. 1 and 2, attached to cover plate 5 is a carriage 7 which has a detachable shaft 8 journaled for rotation thereon. Near one end of shaft 8 is adjustably secured a disc 9 while the other end of the shaft is helically threaded and passes through a threaded pointer holder 10. Projecting downward from pointer holder 10 toward the top of the table is a pointer 11 (as shown in FIG. 1) with a needle 11a at the lower end thereof. When screw shaft 8 is turned (e.g., by means of disc 9), the pointer holder and pointer move along the screw since the holder is prevented from rotating about the screw by a guide rod 12 along which the holder rides. Rod 12, in turn, is attached to carriage 7. It will be seen from all of the figures that screw shaft 8 is oriented with respect to the table top to move the tip of needle 11a over a radial line printed on the graph paper secured to the table top.

Printed or otherwise attached to the peripheral area of one face of disc 9 are markings 9a (as shown in FIG. 1) such as numerals or other symbols representing the variable shown by the concentric circles printed on the polar coordinate graph; the distance between adjacent markings on the disc representing a much smaller incremental value than that represented by the distance between adjacent concentric circles printed on the graph paper. For example, if the concentric circles on the graph paper designate water level change and the distance between adjacent circular markings represents .25 feet, the distance between adjacent markings on the disc can represent .01 feet. Obviously, the disc markings will be based upon the number of turns required by the disc 9 (and shaft 8) to move the pointer along a radial line from the innermost to the outermost circle on the graph paper. An indicator 13 points to the individual markings on the disc 9.

Any ratio between rotation of shaft 8 and the degree of pointer movement can be established by securing to the carriage 7 different detachable screw shafts 8 each having a different screw pitch. For example, in the case of a polar coordinate graph showing the relative water lever of a body of water, wherein the distance between the innermost and outermost concentric circles printed on the paper is representative of a 5 foot water level change, the shaft 8 can have a screw pitch that requires five complete rotations of the disc 9 (and thereby shaft 8) to move the pointer from the innermost to the outermost circle. With such as crew shaft, each complete rotation of the wheel represents a one foot water level change, and the wheel can be calibrated accordingly.

As shown in FIG. 3, table 1 and wheel 4 are secured to a shaft 14 which is journaled to rotate within box 3 by means of bearings 14a and 14b mounted on a block 15. Screw shaft 8 is journaled for rotation on carriage 7 by means of bearings 8a and 8b.

To read a graph, the paper 3 is concentrically placed on top of table 1, as shown in FIGS. 1 and 2, and the paper rotatably slipped over the table top until the magnitude of the variable represented by the radial line immediately under pointer 11 is the same as that shown in window 6 on the peripheral area of wheel 4. For example, in the case of a time-relative water level graph, if the numeral in the window designates 2 p.m., the paper should be slipped until the pointer 11 points to the 2 p.m. radial line printed on the paper.

Thereafter the paper is fixed to the table with, for example, a clip or tape. Next, the pointer 11 is moved along the radial line to one of the concentric circles printed on the graph paper by turning shaft 8 by means of disc 9. Disc 9 is then loosened and rotatably slipped around shaft 8 until the disc number or other symbol immediately adjacent indicator 13 corresponds to the number represented by the graph paper circle at which the pointer 11 is directed, disc 9 then being resecured to the shaft. For example, in the case of a time-relative water level graph, if the pointer 11 points to the concentric circle which represents a zero water level change, the disc 9 should be slipped around shaft 8 until the zero numeral on the disc is immediately adjacent indicator 13, disc 9 then being resecured to the shaft. The graph can now obviously be read by turning shaft 8 to move the pointer 11 so that it points to the recorded graph at each setting shown in window 6; the numeral pointed to on disc 9 by indicator 13 then being read at each window setting.

Sometimes more than one graph is recorded on a single sheet of graph paper (e.g., graphs produced by a stage-rainfall recorder wherein one graph represents relative water level and the other graph represents rainfall), and the distance between adjacent concentric circles printed on the graph paper is representative of different values for each graph. Under these circumstances, after reading one of the graphs, in order to read the second graph the paper can be left in its fixed position on the table, but the screw shaft 8 and/or disc 9 must be changed (e.g., a screw with a different pitch and a disc with different calibrations) in order to accommodate the differential value of the distance between adjacent concentric circles on the second graph. Such a change in elements can be achieved in a matter of seconds with, for example, a screw driver and wrench.

Many modifications in structure can obviously be employed. For example, rather than using a screw shaft to translate the movement of the pointer to the more precise indicating device, a cam or gear arrangement could be employed. Rather than employing a needle point as the pointing means, a pinpoint light source could be employed.

An operator can be quickly trained to use the chart reading device of the present invention, and the device provides for reading consistency among individuals. As much as half the time required to visually read graphs may be saved by employing this device. Furthermore, whatever the particular use of the graph recording instrument, the numerals or symbols printed or otherwise attached to wheel 4 and disc 9 can be scaled to the maximum accuracy of the instrument, whereby the device of the present invention enhances the use of such instruments.

While the particular device herein described is well adapted to carry out the objects of the present invention, it is to be understood that various modifications and changes may be made all coming within the scope of the following claims.

What is claimed is:

1. A device for reading coordinates of a polar coordinate graph on polar coordinate graph paper comprising:
   (a) rotatable means to hold said paper, and including a first disc-shaped rotatable member having a larger radius than said paper, said disc-shaped member being substantially parallel to and polarly coaxially aligned with said paper when said paper is held by said rotatable holding means, said disc-shaped member being calibrated along its peripheral area to read in the $\theta$ coordinate variable represented by the radial lines printed on said paper, the incremental value represented by the distance between adjacent calibrations on said disc-shaped member being substantially smaller than the incremental value represented by the distance between adjacent radial lines printed on said paper;
   (b) a base member;
   (c) means connected to said base member to simultaneously rotate said disc-shaped member and said paper about their polar axes when said paper is held by said rotatable holding means;
   (d) movable pointing means adjacent said rotatable holding means to substantially precisely point at individual points along a locus of points on said paper when said paper is held by said rotatable holding means in a fixed position, said locus of points extending from the innermost to the outermost concentric circle printed on said paper, said locus of points defining a radial path identical to the path followed by radial lines printed on said paper;
   (e) means connected to said base member to move said pointing means to point at said individual points; and
   (f) means connected to said base member and said pointing moving means to measure said movement of said pointing means, said measuring means calibrated to read in the $\rho$ coordinate variable represented by the concentric circles printed on said paper, the incremental value represented by the distance between adjacent calibrations on said measuring means being substantially smaller than the incremental value represented by the distance between adjacent concentric circles printed on said paper.

2. The device of claim 1 wherein said pointing means comprises a pointer holder and a pointer; and wherein said moving means for said pointing means comprises means to move said pointer holder along said radial path.

3. The device of claim 2 wherein said means to move said pointer holder comprises
   (a) a rotatable driving screw extending through a threaded passage through said pointer holder;
   (b) means connected to said base member to hold said screw longitudinally and laterally fixed, and parallel to said locus of points; and
   (c) means connected to said base member to prevent said pointer holder from rotating about said screw when said screw is rotated.

4. The device of claim 3 wherein said measuring means for said $\rho$ coordinate comprises
   (a) a disc coaxially, adjustably secured to said screw; and wherein said calibration marks on said measuring means are markings along the peripheral area of said disc; and (b) an indicator connected to said base member and directed at said calibration marks on said peripheral area of said disc.

5. The device of claim 4 wherein said rotatable holding means includes a second rotatable disc-shaped member parallel to and spaced from said first disc-shaped member, said graph paper being directly held by said second disc-shaped member; and wherein said base member includes a plate disposed between and substantially parallel to said first and second disc-shaped members, said plate substantially covering said first disc-shaped member, said calibrations on said first disc-shaped member being marked on that face of said first disc-shaped member which is adjacent said plate, said plate having a small window to observe individual calibrations on said adjacent face.

6. The device of claim 1 wherein said rotatable holding means includes a second rotatable disc-shaped member parallel to and spaced from said first disc-shaped member, said graph paper being directly held by said second disc-shaped member; and wherein said base member includes a plate disposed between and substantially parallel to said first and second disc-shaped members, said plate substantially covering said first disc-shaped member, said calibrations on said first disc-shaped member being marked on that face of said first disc-shaped member which is adjacent said plate, said plate having a small window to observe individual calibrations on said adjacent face.

References Cited

UNITED STATES PATENTS

| | | | |
|---|---|---|---|
| 1,892,957 | 1/1933 | Lehr | 33—1 |
| 2,510,384 | 6/1950 | Dehmel. | |
| 2,681,264 | 6/1954 | Schmitt et al. | 346—112 |
| 2,702,736 | 2/1955 | Niemann | 346—112 X |
| 3,084,014 | 4/1963 | Molloy | 346—112 X |

WILLIAM D. MARTIN, JR., *Primary Examiner.*